United States Patent [19]

Seward et al.

[11] Patent Number: 4,952,355
[45] Date of Patent: Aug. 28, 1990

[54] METHOD FOR MAKING A PLASTIC TOOL

[76] Inventors: Thomas J. Seward, 1421 Ralph, Garden City, Mich. 48135; Daniel R. Seward, 220 N. Christine, Westland, Mich. 48185

[21] Appl. No.: 242,529

[22] Filed: Sep. 12, 1988

[51] Int. Cl.$^5$ .............................................. B29C 33/38
[52] U.S. Cl. ..................... 264/112; 249/134; 264/225; 264/337; 264/338
[58] Field of Search ................ 164/33; 264/73, 74, 264/77, 131, 139, 256, 225, 226, 227, 112, 337, 338; 425/175; 427/203, 204; 249/134

[56] References Cited

U.S. PATENT DOCUMENTS

| 540,880 | 6/1895 | Sievert | 427/203 |
| 3,968,274 | 7/1976 | Harris et al. | 427/203 |
| 4,160,003 | 7/1979 | Kozuka et al. | 264/226 |

FOREIGN PATENT DOCUMENTS

| 2372009 | 7/1978 | France | 264/225 |
| 0071212 | 4/1985 | Japan | 264/220 |

Primary Examiner—James Lowe
Attorney, Agent, or Firm—Charles W. Chandler

[57] ABSTRACT

A method for making plastic tooling by forming a surface coat over a model of the article to be made. While still in a tacky condition, the surface coat is sprinkled with sand. After the surface coat is cured and has adhered to the sprinkled sand, the surface coat is wet with a laminating resin. Then a sand and epoxy mixture is poured into the core box to form the tool. Another version of the method includes the steps of disposing a vacuum tube into the sand-epoxy core and closing off the open side of the core box through which the core mix was tamped. The surface coat is applied around the model so that the cavity in the finished core is suitable for vacuum-forming an object without forming the conventional vacuum holes.

11 Claims, 2 Drawing Sheets

METHOD FOR MAKING A PLASTIC TOOL

Background of the Invention

This invention is related to a method for making plastic tooling having a surface configuration defined by a model, and for a tool made in accordance with the preferred method and adapted to vacuum-form plastic.

Plastic tooling, in recent years, has become much more economical, efficient and popular for a variety of reasons. The methods for making plastic tooling are generally divided into several general catagories. Laminated plastic tools are made of alternate layers of glass cloth and liquid laminating plastic. After the laminations have been completed, the liquid plastic solidifies into a strong, rigid form. The finished piece has the exact size and shape of the surface from which it was molded. Laminated tools are usually reinforced with or become part of a framework.

Surface cast tools usually have a metallic core, rough cast to the general shape of the finished tool. The core is suspended over a model of the working surface of the tool and liquid plastic cast into the space between the model and the metallic core.

Mass cast tools are usually made entirely of plastic materials. Metal inserts are sometimes built into the unit to strengthen stretch points. Mass casting is usually used where a large tool surface is involved. The material must provide good physical properties, be relatively inexpensive to use and can be cast in large, thick sections. A plastic casting weighs considerably less than a steel or metal casting.

One of the advantages of mass casting is the speed and ease of application. Mass casting compounds are easy to mix and pour and reduce the time required to lay-up a laminate. It also eliminates the cost of producing and preparing the metal cores needed for surface casting.

One of the problems with conventional techniques for mass casting is the build-up of exothermic heat. For this reason mass casting is usually limited to tools about 4 inches thick unless means are provided to reduce the heat build-up.

Another problem is the low-strength properties of most mass casting materials.

Another disadvantage is the high shrinkage encountered particularly in heavier castings. This is due to the heat generated as the casting is curing. The greater the heat generated, the greater the shrink and consequently the loss of dimensional stability.

Conventionally, the model is placed in a core box and then the model surface and the internal wall of the core box coated with a plastic surface coating. The core material is then disposed in the box on the surface coat. However, the core material frequently does not fully and adequately adhere to the surface coat producing an unsatisfactory tool.

Plastic tooling is commonly used as a vacuum-forming tool. The conventional practice is to form several vacuum-forming holes through the surface coat and the core to the vacuum chamber. A vacuum pump draws air through the vacuum chamber and the vacuum holes to form the workpiece.

Summary of the Invention

The broad purpose of the present invention is to provide an improved method for making a plastic tool.

A model is placed in a core box. The model is sprayed with a parting agent so that the tool does not stick to the model. The model and the interior of the cavity are then coated with one or two coats of a conventional liquid coating material. As the coating material is curing, during the short span of time when it is still slightly tacky, the user sprinkles sand over the entire surface coating. He then allows the coating material to cure so as to firmly attach itself to the coating of sand. He then applies a layer of a commercially-available laminating resin to the area on the surface and sidewalls intended to be covered with a sand-epoxy mixture. If the model is small enough, he can tamp the sand-epoxy mixture directly onto the tacky surface coating.

A sand-epoxy mixture is then introduced into the cavity and tamped to form a core that is firmly and uniformly connected to the surface coat by being adhered or attached to the sand coating. When the core has cured, the tool is reversed, the model removed and the tool is ready for making the end product. A support structure can be added if needed.

The sand-epoxy core material produces less heat, can be formed in substantially greater thicknesses than conventional plastic tools, and has excellent dimensional stability.

The invention has particular utility for making a vacuum-forming tool. This embodiment employs the characteristic that the sand and epoxy core has a continuous, uniform porosity. The model is placed in the mold cavity and a vacuum tube inserted through the mold box with its inner end disposed inside the cavity. The surface coating is then applied to the interior of the cavity, but not over the model. The sand and epoxy mixture is tamped in the mold box after the surface coating has been sprinkled with the surface layer of sand. The mold box may be capped off or a layer of epoxy poured in the core sand so that the only openings for passing air into the mold box are through the vacuum tube and through the uncoated part of the core defined by the model.

The tool is then reversed and the model removed. The user can vacuum-form a sheet material laid over the open cavity of the tool by connecting a vacuum pump to the vacuum tube.

The preferred method produces a tool that is relatively inexpensive, requires a lower level of manufacturing skill, compared to that required for making fiberglass molds, and employs materials that cure in a shorter period of time than conventional materials, such as fiberglass. In addition, the dimensional stability is excellent because of the low heat produced during curing of the core material. The preferred process eliminates the necessity of drilling vacuum holes through the core, eliminates the conventional vacuum chamber, and provides a much more uniform vacuum over the surface of the core cavity. The preferred method eliminates the use of fiberglass layers required in conventional techniques for strengthening the tool. It reduces the time for making a tool from four to five days down to about two days. Further, the sand core is mechanically bonded to the surface coat, as opposed to the usual chemical bond.

Still further objects and advantages of the invention will become readily apparent to those skilled in the art to which the invention pertains upon reference to the following detailed description.

Description of the Drawings

The description refers to the accompanying drawings in which like reference characters refer to like parts throughout the several views and in which.

Description of the Preferred Embodiments

Figure 1:
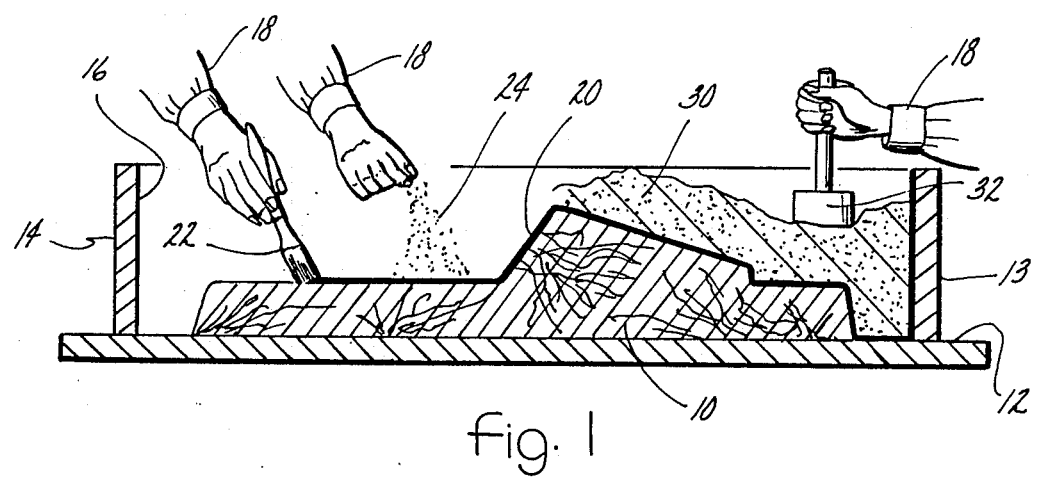
FIG. 1 illustrates the sequence of the material steps in forming a tool in accordance with the invention.

Referring to the drawings, a three-dimensional model 10 is formed in the conventional manner and has its surface polished to a high gloss. The model is laid on the base 12 of a core box 13. A four-sided sidewall or fence 14 is supported on the base and has a height greater than the height of the model. The fence and the base form a cavity 16 for receiving the model. The height of the fence usually depends upon the intended use of the tool being formed in the core box.

The model surface is treated with a conventional release or parting agent to prevent adhesion between the model, and the surface of the tool. Then user 18 applies a liquid surface coat 20 with a brush 22 or other suitable tool. Surface coat 20 is about 1/32 to 1/16 inches thick and is laid over the entire exposed surface of the model and the exposed interior surface of the core box. The user may use a brush, spray gun, or roller to make sure that all interior surfaces are covered. Any of a variety of conventionally-available surface coats are available, for example, from Ren Plastics of Ciba-Geigy Corp., East Lansing, Mich.

A second surface coat of the same thickness is applied over the first surface coat while the first coat is still wet or tacky. The second surface coat is allowed to gel until it is almost tack free. A tacky condition is present if the user presses his finger to the coating and it sticks to his finger. If he rubs his finger against the coating and the surface coat does not stick to his finger, then the coat is in a condition usually lasting but a matter of minutes during which the next step must be followed. The surface coat forms a fluid-impervious shell.

The next step is to sprinkle a layer of sand 24 over the entire exposed surface of the surface coat. This must be accomplished before the second surface coat has cured, that is, the surface coat is still in a somewhat tacky state so that the particles of sand become partially embedded in the surface coat. The entire surface coat is covered with sand, and then allowed to fully cure. This process firmly attaches partially exposed sand particles over the entire surface coat. At this point, the user can leave the job to let the surface coat cure as long as he likes before starting the next step.

The next step is to vacuum out the loose sand. The sand covered surface coat then has a sandpaper-like appearance.

The user then mixes a sand-epoxy mixture 30 using silica sand and any suitable epoxy as a binder. The binder can range from a surface coat material, a laminating resin or most casting resins. Mixture 30 is then placed in the core box. The silica sand is a standard sand that has been washed so there is no dust.

The viscosity of the core material is determined by the ratio of sand to epoxy. For example, the sand to epoxy ratio may be 5 parts sand to 1 part epoxy by volume which is about 7 parts of sand to 1 part of epoxy by weight. The sand and epoxy must be thoroughly mixed for a quality core material. The ratio of sand to epoxy may vary depending upon the purpose for which the tool is being made. It may range up to as much as 12 parts sand to 1 part epoxy.

After mixing the core material, and after the sanded surface has been wetted with a laminating resin, a little of the core material is spread into the core box, checking to make sure that the mix is thorough. The user applies it with his hands and then tamps it firmly in place with a tool 32. A 3-5 inch layer of core material is tamped in place. If more of the sand-epoxy mixture is needed, the user during the next day, can apply a coating of surface laminating resins in those areas intended to receive more of the sand-epoxy core material, applying it the same way he did the day before.

In most cases 3-5 inches of sand-epoxy mixture will give you the required strength. In some cases a support structure, such as a plywood structure, is used instead of adding more sand-epoxy mixture to level the base.

Some tools require a heating or cooling system. The system is usually installed 1 inch from the model surface.

A 1 inch layer of the sand-epoxy mixture is spread over the entire surface. When the layer has cured, the heating or cooling system is installed. The surface is wetted with a laminating resin. Then a sand-epoxy mixture with aluminum grain is added, covering the heating or cooling system. Usually two parts aluminum grain is mixed with one part sand-epoxy mixture. The mixture is firmly tamped into place. This provides a more uniform heating or cooling distribution through the aluminum grain with less porosity and air entrapment around the heating and cooling system. Excessive porosity or air voids existing in compression tooling, tend to move to the surface, requiring repair later on.

Figure 2:
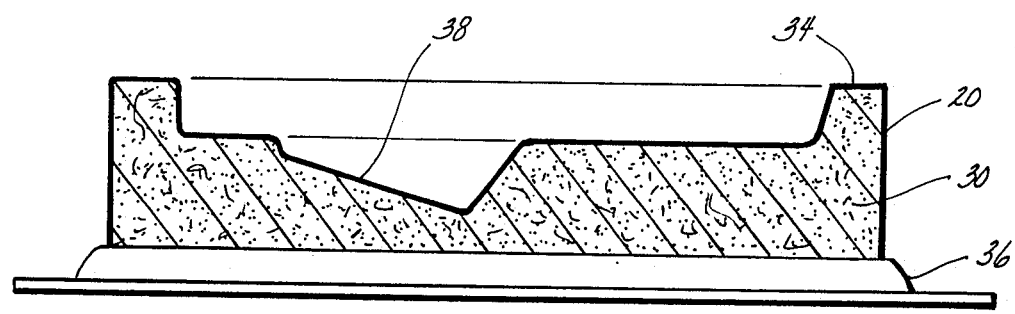
FIG. 2 is a view of a tool formed in accordance with the invention with the model removed and the tool inverted.

The core box is filled with the sand epoxy mixture to the top of fence 14. When the core mix has cured, the finished tool, illustrated at 34 in FIG. 2, is then removed from the core box, separated from the model, inverted and is then ready for use. It may be mounted on a base member 36, if necessary. The tool then has a cavity 38 lined by the surface coating for receiving the material that is to be cast in the conventional manner.

Figure 3:
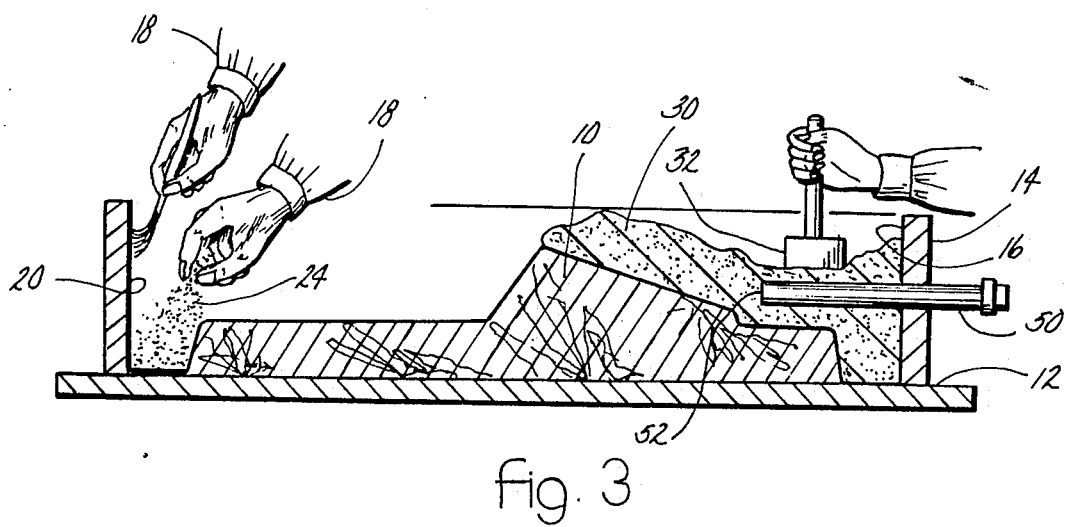
FIG. 3 is a view illustrating the material steps in forming a vacuum-forming tool.
Figure 4:
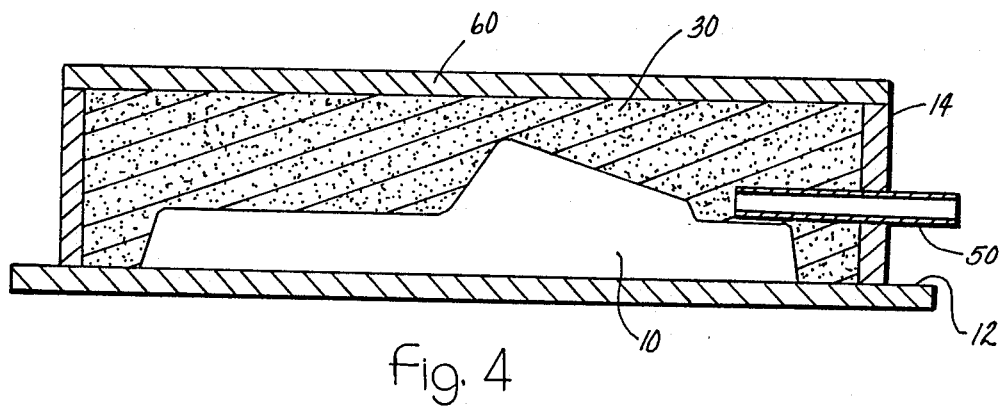
FIG. 4 is a sectional view showing the mold box capped off.
Figure 5:
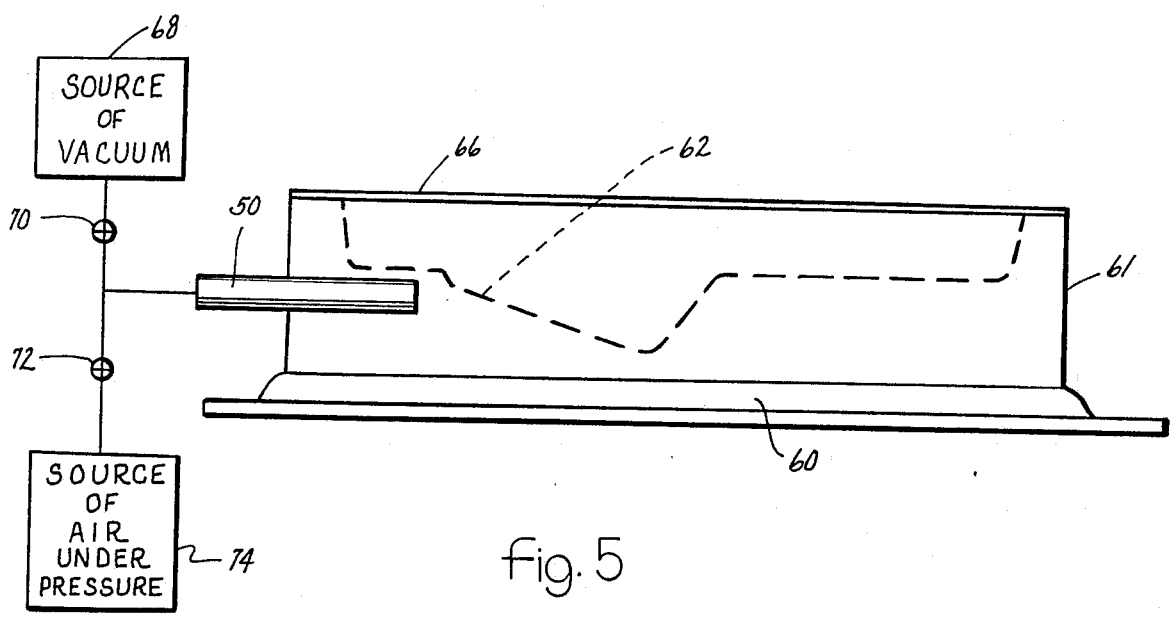
FIG. 5 is a partially sectional view showing the manner in which the tool of FIGS. 3-4 is employed for vacuum-forming an object.

FIGS. 3-5 illustrate another embodiment of the invention. In this case, the tool is to be used for vacuum-forming an object rather than casting it. Model 10 is placed on base 12. A parting agent is applied to the surface of the model. The user then double-coats the entire inside exposed surface of cavity 16 to form an air impervious surface coat 20 but not the exposed surfaces of the model. As in the embodiment illustrated in FIGS. 1-2, the user then sprinkles sand on the surface coat while it is still tacky. The surface coat can be placed on some areas of the model, if more detail is required.

When the surface coat has been fully cured so that it has a sandpaper-like appearance, with the particles of sand being partially embedded in the cured surface coat, the user then vacuums out the loose dust and sand. At this point he inserts a vacuum tube 50 through fence 14, or the vacuum tube may be part of the fence. In any event, the inner end 52 of the tube is in a spaced position from the fence, in the core box and the opposite end, outside the core box. The user then wets the sanded surface with a laminating resin and applies the sand-epoxy core mixture in cavity 16, tamping it in place with tool 32 until the core mix is the full height of the fence.

Referring to FIG. 4, a layer of fiberglass 60 or other suitable material is formed on top of the fence to totally close-off the top opening of the core box. Referring to FIG. 5, when the fiberglass has been fully cured, the tool which in this case includes the core box, is then turned upside down and the model removed. The finished tool 61 then has a cavity 62 having the surface configuration of the model. The only air-passing openings into the tool are through vacuum tube 50 and the uncoated surface of cavity 62.

We have found that a sand epoxy core mixture having a ratio of about 5:1 sand to epoxy, depending upon the user's intent, is very strong, however, it also provides a surface for cavity 62 that is uniformly porous so that no vacuum holes have to be drilled through the core material. The user can then vacuum form a plastic component by laying a sheet 66 of a formable plastic on the tool, applying a vacuum to the tool core from a vacuum pump or source 68. This is achieved by opening valve means 70 to draw air from cavity 62 through vacuum tube 50 such that sheet 66, which may be heated, is drawn down into cavity 62 to take the shape of the cavity.

When the sheet has been fully formed, the user closes valve 70, if needed, opens valve 72 which connects the tool to a source of pressurized air 74 which passes air through tube 50, and the porous core to eject the formed part from the cavity.

The tool may be post-cured or run at room temperature depending upon the type of epoxy used. Post-curing at room temperature usually requires seven days to reach maximum physical strength. A post-cure of 3-4 hours at 125° F. usually improves the physical properties of most core materials. Higher postcures are only recommended for high temperature systems.

Thus it is to be understood that we have described an improved method for making plastic tools, and an improved plastic tool. Some of the advantages of employing the preferred sand epoxy mixture is that it requires fewer hours to make a tool, and a lower skill level of the tool maker. The core materials are less expensive than conventional materials, the tools are repairable, and crushing equipment can be used to recycle the tool material.

Having described our invention, we claim:

1. A method for mass casting a plastic tool, comprising the steps of:
    making a model of a part to be cast;
    disposing the model in the cavity of a core box;
    applying a release agent on the surface of the model;
    applying first and second surface coats in the cavity containing the model over at least the exposed surface of the cavity, the second surface coat being applied on the first surface coat before the first coat has fully cured, and allowing the second surface coat to partially cure;
    distributing sand particles over the second surface coat such that the sand particles adhere to the second surface coat before it has fully cured;
    applying a thin coating of a laminating resin on the distributed sand;
    introducing a core material comprising a mixture of sand and an epoxy which hardens into a rigid mass, into the cavity, over the laminating resin to cover the model, and permitting the mass to harden so that the core material becomes connected to the surface coat by attachment to the sand particles distributed on the second surface coat.

2. A method as defined in claim 1, in which the core material is a mixture of sand and an epoxy so mixed as to be porous when it becomes hardened.

3. A method as defined in claim 1, in which the first surface coat is applied on the surface of the model in the core box.

4. A method as defined in claim 1, including the step of applying the first surface coat to the interior surface of the cavity and not to the surface of the model.

5. A method as defined in claim 4, in which the core box has a vacuum tube for passing air either into or out of the core box cavity.

6. A method for making a plastic tool, comprising the steps of:
    making a model of a part to be cast;
    disposing the model in the cavity of a core box so as to cover a portion of the interior surface thereof;
    the core box having vacuum tube means into the interior thereof;
    applying a parting agent to the surface of the model;
    applying an air impervious surface coat in the cavity containing the model through an opening over the uncovered surface of the cavity, but not over the exposed surfaces of the model, and allowing the surface coat to partially cure;
    distributing sand particles over the surface coat such that the sand particles adhere to the surface coat before it has fully cured;
    applying a thin layer of a laminating resin on the sand particles;
    introducing a porous core material comprising a mixture of sand and an epoxy which hardens into a rigid mass, into the cavity, over the laminating resin and the model and permitting the mass to harden so that the core material becomes connected to the surface coat by attachment to the sand distributed on the partially cured surface coat;
    removing the model to define a cavity having the configuration of the model in the core material; and
    closing said opening and connecting vacuum means to the vacuum tube means capable of drawing air through the core material.

7. In a method for mass casting a plastic tool including the steps of making a model of the part to be cast; disposing the model in the cavity of a core box; applying a release agent on the surface of the model; applying a first surface coat in the cavity containing the model over at least the exposed surface of the cavity; applying a second surface coat on the first surface coat before the same has fully cured; applying a thin coating of a laminating resin over said second surface coat; introducing a core material, capable of forming a rigid mass, into the cavity and over the laminating resin to cover the model; permitting the mass to harden; then removing the hardened mass and the surface coat from the core box to separate them from the model; the improvement which includes the step of:
    distributing sand particles over the second surface coat after it has cured such that it is almost tack free, but before the second surface coat has cured such that the sand particles will not adhere to the second surface coat, whereby the sand particles assist in attaching the second surface coat to the coating of the laminating resin and the hardened mass.

8. A method as defined in claim 7, including the step of applying the first surface coat over both the model and the exposed surface of the cavity.

9. In a method for mass casting a plastic tool including the steps of making a model of the part to be cast; disposing the model in the cavity of the core box; applying a release agent on the surface of the model; applying first and second surface coats in the cavity containing the model over at least the exposed surface of the cavity; applying a thin coating of a laminating resin over the second surface coat; introducing a core material, capable of forming a rigid mass, into the cavity and over the laminating resin to cover the model; permitting the mass to harden; then removing the hardened mass with said first and second surface coats from the core box to separate them from the model; the improvement which includes the steps of;

applying the second surface coat over the first surface coat when the first surface coat is almost tack-free but before it is tack-free; and distributing sand particles on the second surface coat before it is tack-free so that the sand particles assist in attaching the core material to said surface coats.

10. A method as defined in claim 9, including the step of the user running his finger across the second surface of the surface coat without the coating material adhering to his finger to determine if the surface coat is almost tack free.

11. A method for mass casting a plastic tool, comprising the steps of:

making a model of a part to be cast;

disposing the model in the cavity of a core box;

applying a release agent on the surface of the model;

applying first and second coats in the cavity containing the model over at least the exposed surface of the cavity, the second surface coat being applied on the first surface coat before the same has fully cured, and allowing the second surface coat to partially cure;

distributing sand particles over the second surface coat such that the sand particles adhere to the second surface coat before it has fully cured;

applying a thin coating of a laminating resin on the distributed sand;

introducing a core material comprising a mixture of sand and an epoxy which hardens into a rigid mass, into the cavity, over the laminating resin to cover the model, and permitting the mass to harden so that the core material becomes connected to the surface coats by attachment to the sand particles distributed on the second surface coat.

* * * * *